(12) United States Patent
Maguire et al.

(10) Patent No.: US 7,698,884 B2
(45) Date of Patent: Apr. 20, 2010

(54) POWER TRANSMISSION ARRANGEMENT

(75) Inventors: Alan R. Maguire, Findern (GB); David C. Butt, Breaston (GB); Martyn Richards, Burton-On-Trent (GB); Geoffrey E. Kirk, Loughborough (GB); David A. Edwards, Derby (GB); Glenn A. Knight, Belper (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/222,551

(22) Filed: Aug. 12, 2008

(65) Prior Publication Data

US 2008/0302082 A1 Dec. 11, 2008

Related U.S. Application Data

(63) Continuation of application No. 10/939,422, filed on Sep. 14, 2004, now abandoned.

(30) Foreign Application Priority Data

Sep. 19, 2003 (GB) .................................. 0321952.4
Mar. 17, 2004 (GB) .................................. 0405943.2

(51) Int. Cl.
*F02C 3/107* (2006.01)
*F02C 7/36* (2006.01)
*F02C 7/32* (2006.01)

(52) U.S. Cl. .................... 60/39.163; 60/788; 74/DIG. 5

(58) Field of Classification Search ............... 60/39.163, 60/786–788; 74/DIG. 5
See application file for complete search history.

(56) References Cited

U.S. PATENT DOCUMENTS

| | | | | | |
|---|---|---|---|---|---|
| 3,710,576 | A | * | 1/1973 | Evans et al. ................... | 60/773 |
| 3,786,696 | A | * | 1/1974 | Aleem .......................... | 475/77 |
| 3,792,586 | A | * | 2/1974 | Kasmarik et al. ........... | 60/226.1 |
| 4,043,119 | A | * | 8/1977 | Faulkner ...................... | 60/788 |
| 4,776,163 | A | * | 10/1988 | Brockmann ................. | 60/792 |
| 5,694,765 | A | * | 12/1997 | Hield et al. ............... | 60/39.163 |
| 5,867,979 | A | * | 2/1999 | Newton et al. ............. | 60/226.1 |

FOREIGN PATENT DOCUMENTS

| | | | |
|---|---|---|---|
| GB | 1549149 | * | 7/1979 |
| GB | 697408 | * | 9/1983 |
| GB | 2117500 | * | 10/1983 |

* cited by examiner

*Primary Examiner*—Ted Kim
(74) *Attorney, Agent, or Firm*—Jeffrey S. Melcher; Manelli Denison & Selter PLLC

(57) ABSTRACT

A power transmission arrangement comprises a first power transmission member connectable to a first main shaft of an engine. The arrangement also includes a second power transmission member connectable to a second main shaft of the engine and to a third power transmission member. A coupling assembly is provided which has a selectable coupling condition to couple the first power transmission member to the second power transmission member to allow power to be transmitted from the third power transmission member to the first main shaft of the engine via the first power transmission member. The coupling assembly has a decoupling condition to decouple the first power transmission member from the second power transmission member to allow power to be transmitted from the main shaft of the engine to the third power transmission member via the second power transmission member.

43 Claims, 9 Drawing Sheets

POWER TRANSMISSION ARRANGEMENT

This application claims priority to British application GB 0321952.4 filed Sep. 19, 2003 and to British application 0405943.2 filed Mar. 17, 2004. This application is a continuation application of U.S. application Ser. No. 10/939,422 filed Sep. 14, 2004 and now abandoned.

FIELD OF THE INVENTION

This invention relates to power transmission arrangements. More particularly, but not exclusively, the invention relates to power transmission arrangements for use in engines, such as gas turbine engines. More particularly, but not exclusively, the invention relates to power transmission arrangements for providing start up power to a gas turbine engine and taking power from a main shaft of a gas turbine engine.

BACKGROUND OF THE INVENTION

In modern aircraft, there is generally an increased requirement for electric power. Typically, power can be taken from the main shafts of the engine. Also, it is necessary to provide power to an engine during start up.

SUMMARY OF THE INVENTION

According to one aspect of the invention, there is provided a power transmission arrangement comprising a first power transmission member connectable to a first main shaft of an engine, a second power transmission member connectable to a second main shaft of an engine and to a third power transmission member, and a coupling assembly having a coupling condition to couple the first power transmission member to the second power transmission member to allow power to be transmitted from the third power transmission member to the first main shaft of an engine via the first power transmission member, and having a selectable decoupling condition to decouple the first power transmission member from the second power transmission member to allow power to be transmitted from the second main shaft of the engine to the third power transmission member via the second transmission member.

According to another aspect of this invention, there is provided a power transmission arrangement comprising a first power transmission member connectable to a first main shaft of an engine, a second power transmission member connectable to a second main shaft of an engine and to a third power transmission member, characterised by a coupling assembly having a selectable coupling condition to couple the first power transmission member to the second power transmission member to allow power to be transmitted from the third power transmission member to the first main shaft of the engine via the first power transmission member, and having a selectable decoupling condition to decouple the first power transmission member from the second power transmission member to allow power to be transmitted from the second main shaft of the engine to the third power transmission member via the second transmission member. The coupling condition may comprise a selectable coupling condition.

Preferably the coupling assembly is mounted on the first and second power transmission members.

In a first embodiment, the coupling assembly may comprise a fluid operated coupling. Conveniently, the coupling assembly comprises a hydraulic clutch.

In the first embodiment, the coupling assembly may comprise a main body, which may have first and second parts. The first and second parts are preferably movable relative to each other. The first part may comprise a first fluid chamber, and the second part may comprise a second fluid chamber. The first and second fluid chambers are preferably in fluid communication with each other. The first part is preferably mounted on the first power transmission member. The second part is preferably mounted on the second power transmission member.

The first and second power transmission members may comprise shafts. The first and second power transmission members may be arranged coaxially of each other. Preferably, the second power transmission member is arranged within the first power transmission member. A second power transmission member may comprise a connection member to drivingly connect the third power transmission member thereto. Preferably, the connection member comprises a gear arrangement to drivingly connect the third power transmission member to the second transmission member.

Preferably, the second power transmission member extends through the coupling assembly to said connection means.

In one embodiment the coupling assembly may be mounted on the first and second power transmission members and may be co-axial therewith.

In another embodiment, the coupling assembly may be offset from the first and second power transmission members and may be connected to the first and second power transmission members by ancillary gear arrangements. The first part of the coupling assembly may be connected by a first ancillary gear arrangement to the first power transmission member. The second part of the coupling assembly may be connected by a second ancillary gear arrangement to the second power transmission member.

The third power transmission member may extend from the coupling assembly. Preferably, the third power transmission member is fixedly attached to the first coupling assembly, and is conveniently fixedly attached to the second part of the coupling assembly.

Each of the first and second fluid chambers may be of an annular configuration. Preferably, each of the first and second fluid chambers is of a toroidal configuration. Each of the aforesaid toroids may be defined by a semi-circle. Preferably, the main body has a configuration of a torus defining a space which may receive at least one of said power transmission members. Preferably, the power transmission member comprises the second power transmission member. The space may receive both of said power transmission members. The second power transmission member may extend wholly through the aforesaid space.

Each of the chambers preferably includes a plurality of vanes, which may be radially extending vanes.

The main body may include drain means to allow fluid in the main body to drain therefrom. Preferably, the drain means comprises a drain aperture or a plurality of drain apertures defined in the main body. The, or each, drain aperture may be defined to a region between the first and second chambers.

The coupling assembly may comprise an enclosure in which the main body is arranged. Preferably, fluid from the main body can drain into the enclosure.

The coupling assembly may comprise a fluid supply system to supply fluid to the main body. The fluid supply system may be arranged to supply fluid to the main body via the central member extending into, or through, said space in the main body.

Alternatively, fluid supply system may be arranged to supply fluid to the main part externally of the central space.

Preferably, the fluid supply is supplied through one or more fluid supply holes in the main body.

In a second embodiment, the coupling assembly may comprise a friction clutch. The friction clutch may comprise a first clutch member mounted on the first power transmission member, and a second clutch member mounted on the second power transmission member.

The first clutch member may comprise a first clutch plate. The second clutch member may comprise a second clutch plate.

The first clutch member may comprise a driven clutch member, and the second clutch member may comprise a driving clutch member, the first clutch member being driven by the second clutch member.

The friction clutch may further comprise force applying means to apply a force to at least one of the first and second clutch members, to move the first and second clutch members relative to each other into engagement with each other whereby the second clutch member can drive the first clutch member. Preferably, the force applying means can apply the aforesaid force to the second clutch member.

The force applying means may comprise a piston arrangement. The piston arrangement may comprise a fluid receiving part to receive a fluid, such as hydraulic fluid, to apply a force to move the first and second clutch members relative to each other into engagement with each other.

The fluid receiving part may comprise a chamber to receive said fluid.

The friction clutch may comprise disengaging means to disengage the first and second clutch members from each other.

The disengaging means may comprise a second fluid receiving part to receive a fluid, such as a hydraulic fluid to move the first and second clutch members away from each other.

The second fluid receiving part may comprise a second chamber to receive said fluid.

Alternatively, the disengaging means may comprise a spring arrangement to move the first and second clutch members away from each other.

The friction clutch may comprise a bearing arranged between the force applying means and the first or second clutch members. Preferably the bearing is arranged between the force applying means and the second clutch member. The bearing may be connected to the force applying means and the first or second clutch member. Alternatively, the bearing may be connected to one of the force applying means and the first or second clutch member, thereby engaging the other when said fore is applied.

The bearing may comprise a thrust bearing.

The second clutch member may be slidable along the second power transmission members, anti-rotation means may be provided on the second power transmission member to prevent rotation of the second clutch member around the second power transmission member. The anti-rotation means may comprise splines which may extend axially along the second power transmission member.

In a third embodiment, the coupling assembly may comprise a centrifugal fluid clutch. The centrifugal fluid clutch may comprise a first clutch member mounted on the first power transmission member and a second clutch member mounted on the second power transmission member.

The first clutch member may comprise a first clutch plate. The second clutch member may comprise a second clutch plate. The first clutch member may comprise a driven clutch member. The second clutch member may comprise a driving clutch member.

The centrifugal clutch may further comprise force applying means to apply a force to at least one of the first and second clutch members to move the first and second clutch members relative to each other away from each other, whereby the second clutch member is disengaged from the first clutch member.

The force applying means may comprise a piston arrangement. The piston arrangement may comprise a fluid receiving part to receive fluid, such as a hydraulic fluid, to apply a force to move the first and second clutch members relative to each other away from each other.

The fluid receiving part may comprise a chamber to receive said fluid.

The centrifugal clutch may further include engaging means to move the first and second clutch members relative to each other into engagement with each other. The engaging means may comprise a resilient urging member, which may be a spring or an arrangement of springs. The, or each, spring may be annular.

The second power transmission member may comprise a radially extending part which may be annular. The resilient urging member may engage the aforesaid radially extending part. Preferably, the resilient urging member is arranged between the radially extending part and the second clutch member to urge the second clutch member into engagement with the first clutch member.

The chamber may be arranged to receive fluid therein. Preferably, the second power transmission member defines one or more radially extending apertures through which the fluid can be supplied from the centre of the second power transmission member into the chamber. Thus, as the speed of rotation of the second transmission member increases, the fluid is moved by centrifugal force into the chamber and acts on the piston to disengage the second clutch member from the first clutch member.

A safety member may be provided to engage the piston to prevent the second clutch plate engaging the first and second power transmission members, the safety member may be expandable to engage the piston as aforesaid. The safety member may comprise a ring, conveniently, a split ring. Thus, in the preferred embodiment, the safety member holds the first and second clutch members disengaged from each other in the event that the supply of fluid fails.

In a fourth embodiment, the coupling assembly may comprise a gear arrangement, which may comprise a plurality of gear members. The gear arrangement may comprise a primary sun gear. The primary sun gear may be mounted on one of the first and second power transmission members. The gear arrangement may further comprise a secondary sun gear. The secondary sun gear may be mounted on the other of the first and second power transmission member.

Preferably, the primary sun gear is mounted on the second power transmission member. Preferably, the secondary sun gear is mounted on the first power transmission member.

The gear arrangement may comprise at least one primary planet gear in engagement with the primary sun gear. The sun gear arrangement may further comprise at least one secondary planet gear, which may be in engagement with the secondary sun gear.

The primary planet gear is preferably connected to the secondary planet gear so that the primary and secondary planet gears rotate with each other. Advantageously, the primary and secondary planet gears are connected to each other so that they rotate synchronously with each other.

The gear arrangement may comprise a plurality of primary planet gears and a corresponding plurality of secondary planet gears. Each primary planet gear is preferably fixedly connected to a respective one of the secondary planet gears.

The gear arrangement may further include a carrier which may be in the form of an annular member. The, or each primary planet gear may be arranged on one axial side of the carrier and the, or each, secondary planet gear may be arranged on the opposite axial side of the carrier.

Preferably, the primary and secondary planet gears are connected to one another by a shaft. The, or each, shaft preferably extending through the carrier, and the, or each, shaft is preferably rotatable relative to the carrier.

A brake may be provided to brake the carrier to restrict or prevent movement of the carrier. When the brake is applied, rotation of the primary sun gear is transmitted via the primary and secondary planet gears to the secondary sun gear to effect rotation of the secondary sun gear, thereby transmitting rotation of one of the first and second power transmission members to the other of the first and second power transmission members. When the brake is not applied and the carrier is free to rotate the primary and secondary sun gears can rotate independently of each other, thereby allowing the first and second power transmission members to rotate independently of each other.

It will be appreciated by the skilled person that appropriate selection of gear ratios enables the rotation of the first and second power transmission members to be coupled to each other when the carrier is locked and enables the first and second power transmission members to rotate independently of each other when the brake is released.

In another embodiment, the coupling assembly may be arranged to automatically disconnect the first and second power assemblies when the drive arrangement is self powering.

The first power assembly may comprise a first torque transmitter, and the second power assembly may compromise a second torque transmitter the coupling assembly may be arranged to automatically disconnect the first and second torque transmitters when said torque transmitters rotate at predetermined speeds. The coupling assembly may be arranged to automatically disconnect the first and second torque transmitters when the first torque transmitter means rotates at a greater speed than the second torque transmitter.

The coupling assembly may include a ratchet and pawl system, with pawls on a first shaft selectively engageable with ratchets on a second concentric shaft. The second shaft may be located within the first shaft.

Alternatively the coupling assembly may be of a different mechanical lock up type such as a sprag or roller ramp arrangement. Alternatively the coupling assembly may be of a friction type and perhaps in the form of a drum, disc or cone arrangement.

The coupling assembly may be of an electromagnetic type, and may be in the form of a magnetic particle, eddy current or hysteresis arrangement. As further alternatives the connection means may comprise an oil sheer arrangement, a friction plate or electromagnetic clutch, a hydraulic torque converter with bypass valve or an electric motor.

The first and second power transmission members may extend respectively from the first and second torque transmitters with the coupling assembly engageable between first and second power transmission members. The first and second power transmission members may comprise first and second concentric shafts.

The intermediate pressure and high pressure turbines may rotate in respective opposite directions, with gearing provided to cause the first and second power transmission members to rotate in the same direction. The first and second torque transmission members may be in the form of concentric shafts.

The coupling assembly may be arranged such that the first and second power transmission members and hence the first and second torque transmitters disconnect when the first power transmission member rotates at a greater speed than the second power transmission member.

The second torque transmitter may be arranged to drive a power takeoff. The power takeoff may connect to a generator, and the starter may be arranged to switch to being a generator following starting of the drive arrangement.

The coupling assembly may include sensors to detect the speed of the first and second power transmission members and hence the speed of the first and second torque transmitters which sensors may be connected to a control unit to the drive arrangement.

According to another aspect of the present invention there is provided a gas turbine engine, the engine including first and second compressors; first and second turbines; a first drive means to connect the first compressor to the first turbine such that during running of the engine the first turbine drives the first compressor; second drive means to connect the second compressor to the second turbine such that during running of the engine the second turbine drives the second compressor; engine starter means for turning the engine during starting thereof; a power transmission arrangement as described above connected to the starter means and arranged to couple together the first and second drive means during starting, such that both the first and second drive means are turned by the starter means during starting, the power transmission arrangement also being arranged to decouple the first and second drive means following starting to permit independent turning thereof.

Preferably, the engine includes power receiving means connected to the second drive means. Preferably, the second drive means drives the power receiving means after decoupling of the first and second drive means from each other.

The first compressor may comprise a high pressure compressor. The first turbine may comprise a high pressure turbine. The first drive means may comprise a high pressure shaft interconnecting the high pressure compressor and turbine.

The second compressor may comprise an intermediate pressure compressor. The second turbine may comprise an intermediate pressure turbine. The second drive means may comprise an intermediate shaft interconnecting the intermediate pressure compressor and turbine.

According to another aspect of this invention there is provided a coupling assembly comprising a main body having a first part coupled by fluid to a second part, the first part being mountable on a first power transmission member and the second part being mountable on a second power transmission member, the main body defining a space to receive at least one of the power transmission member, and the coupling assembly further comprising fluid supply means for supplying fluid to the main body to supply fluid to a region of the main body outside the aforesaid space.

Preferably, the fluid comprises a hydraulic fluid. The first part may comprise a first fluid chamber, and the second part may comprise a second fluid chamber.

Each of the first and second fluid chambers may be of an annular configuration. Preferably, each of the first and second fluid chambers is of a toroidal configuration. Each of the aforesaid toroids may be defined by a semi-circle. Preferably, the main body has a configuration of a torus defining said space, which is preferably a central space of the torus.

Preferably, the space can receive the second power transmission member. In one embodiment, the space may receive both of said power transmission members. The second power transmission member may extend wholly through the space.

Each of the fluid chambers preferably includes a plurality of vanes, which may be radially extending vanes.

The main body may include drain means to allow fluid in the main body to drain therefrom. Preferably, the drain means comprises a drain aperture or a plurality of drain apertures defined in the main body. The, or each, drain aperture may be defined in a region between the first and second chambers. The clutch assembly may include an enclosure in which the main body is arranged. Preferably, fluid from the main body can drain into the enclosure.

BRIEF DESCRIPTION OF THE DRAWINGS

Embodiments of the invention will now be described by way of example only, with reference to the accompanying drawings, in which:—

DETAILED DESCRIPTION OF THE INVENTION

Figure 1:
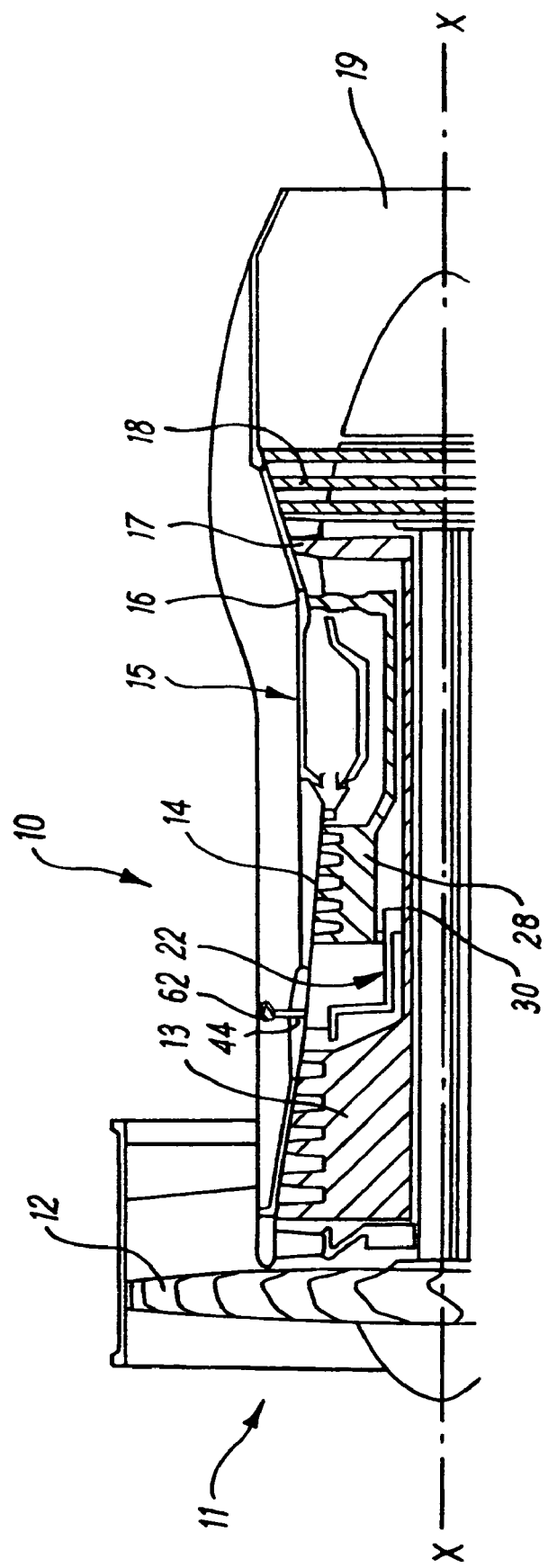
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting main shafts.

Figure 2:
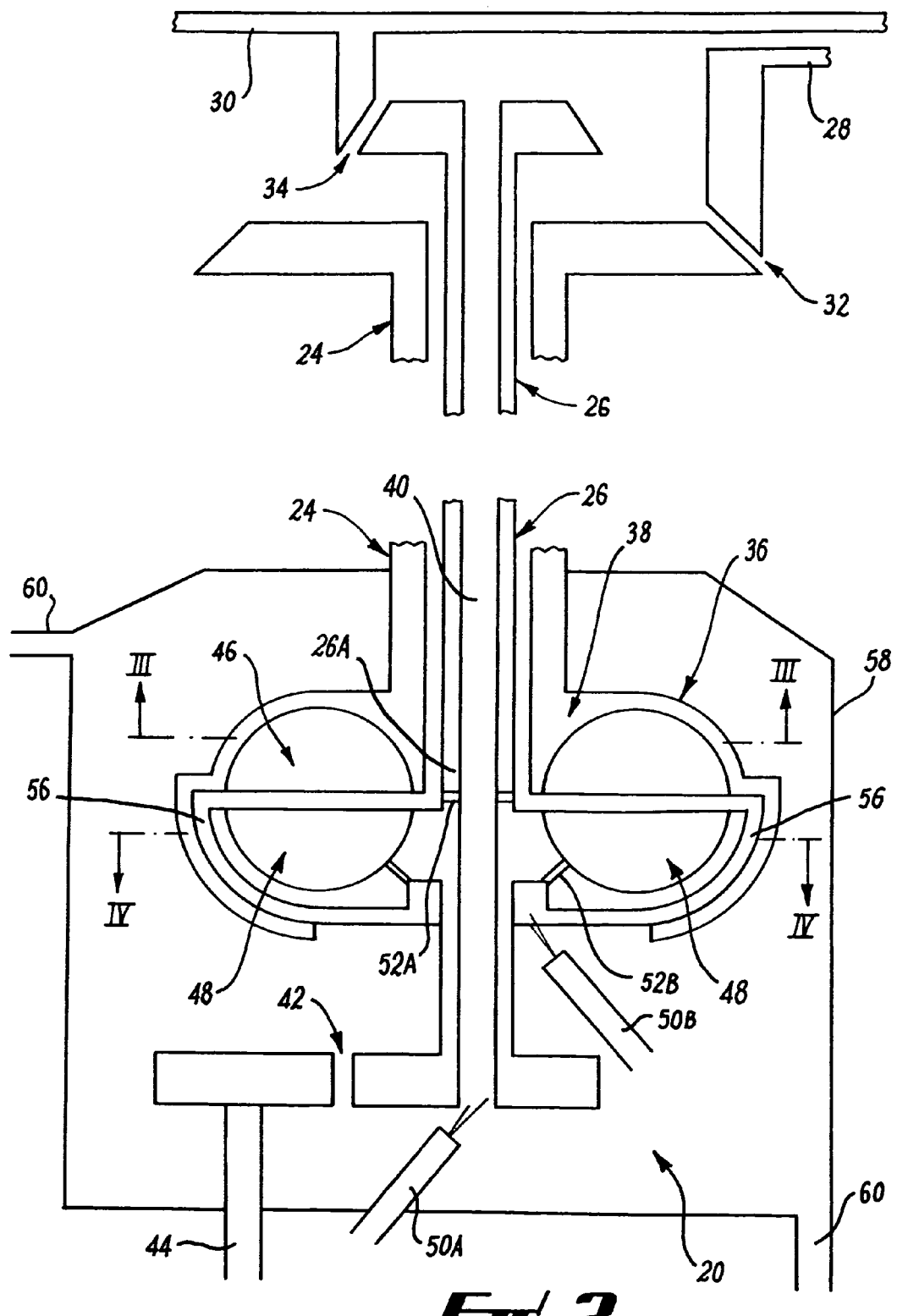
FIG. 2 is a diagrammatic more detailed cross sectional view through part of the engine shown in FIG. 1 showing one embodiment of a power transmission arrangement.
Figure 3:
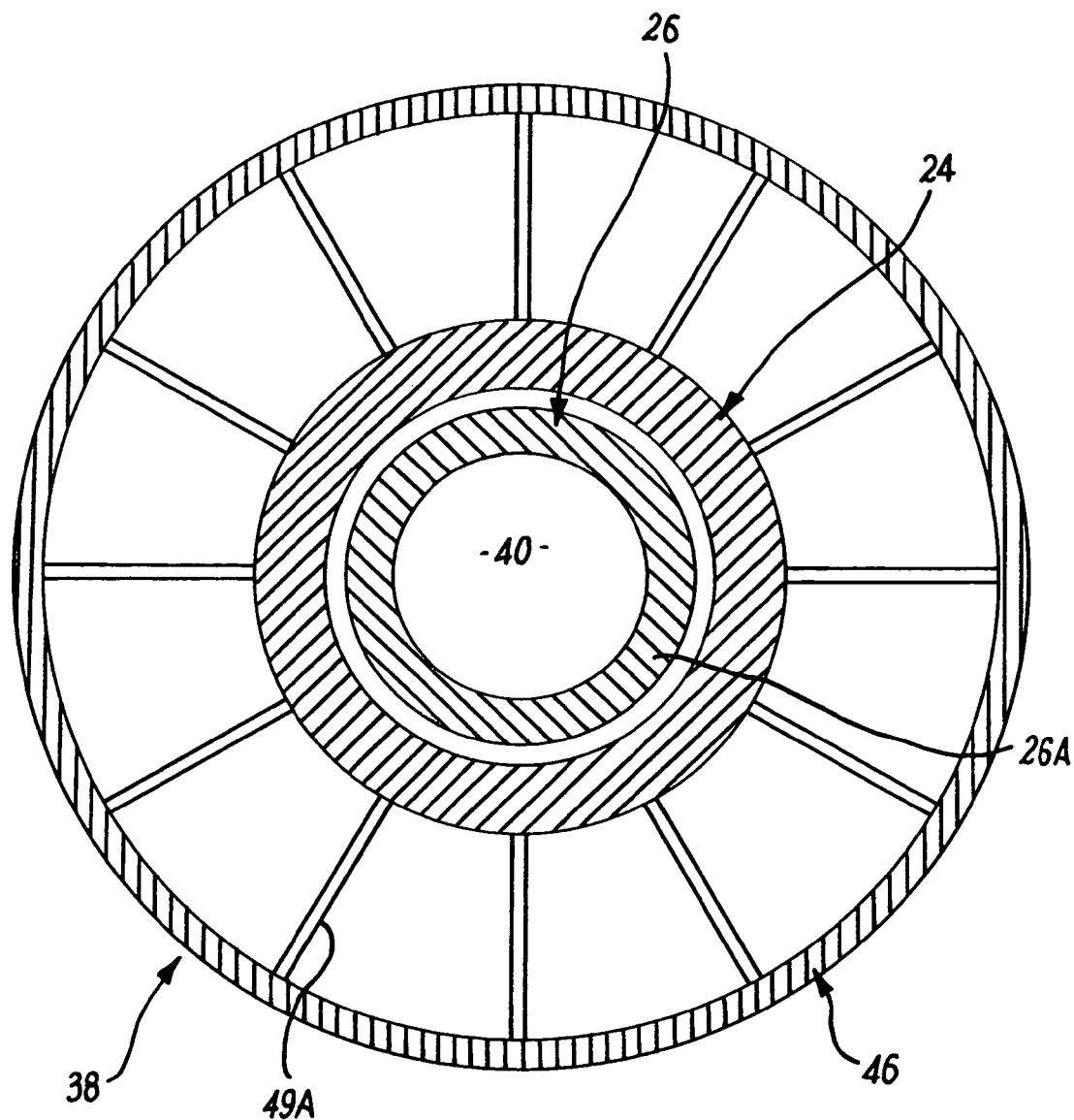
FIG. 3 is a cross-sectional view in the direction of the arrows III-III in FIG. 2.

FIGS. 2 and 3 show a power transmission arrangement 20 arranged between the intermediate and high pressure compressors 13, 14. The location of the power transmission arrangement 20 is indicated diagrammatically at 22 on FIG. 1. The power transmissions arrangement 20 is usable when starting the engine 10 and also providing a power takeoff during running of the engine 10.

The power transmission arrangement 20 comprises coaxial first and second power transmission shafts 24, 26, with the second power transmission shaft 26 arranged within the first power transmission shaft 24. The first and second power transmission shafts 24, 26 extend generally to first and second torque transmitters in the form of the high pressure and intermediate pressure main shafts 28, 30. The first power transmission shaft 24 extends to a high pressure main shaft 28 interconnecting the high pressure compressor 14 and the high pressure turbine 16. The first power transmission shaft 24 is drivingly connected to the high pressure main shaft 28 by a first beveled gear arrangement 32. The second power transmission shaft 26 connects to the intermediate pressure main shaft 30 by a second beveled gear arrangement 34 in an opposite orientation to the gear 32. The main shafts 28, 30 in use rotate in opposite directions, but the opposite alignment of the beveled gear arrangement 32, 34, causes the first and second power transmission shafts 24, 26 to rotate in the same direction. The first and second power transmission shafts 24, 26 are selectively coupled to, and decoupled from, each other by a coupling assembly 36.

The coupling assembly 36 comprises a main body 38 in the form of a torus defining a central space 40 through which the second power transmission shaft 26 extends. The second power transmission shaft 26 is connected via a third gear arrangement 42 to a third power transmission member 44, which is, in turn, connected to a start-up motor or power takeoff generator 62 (see FIG. 1).

Figure 4:
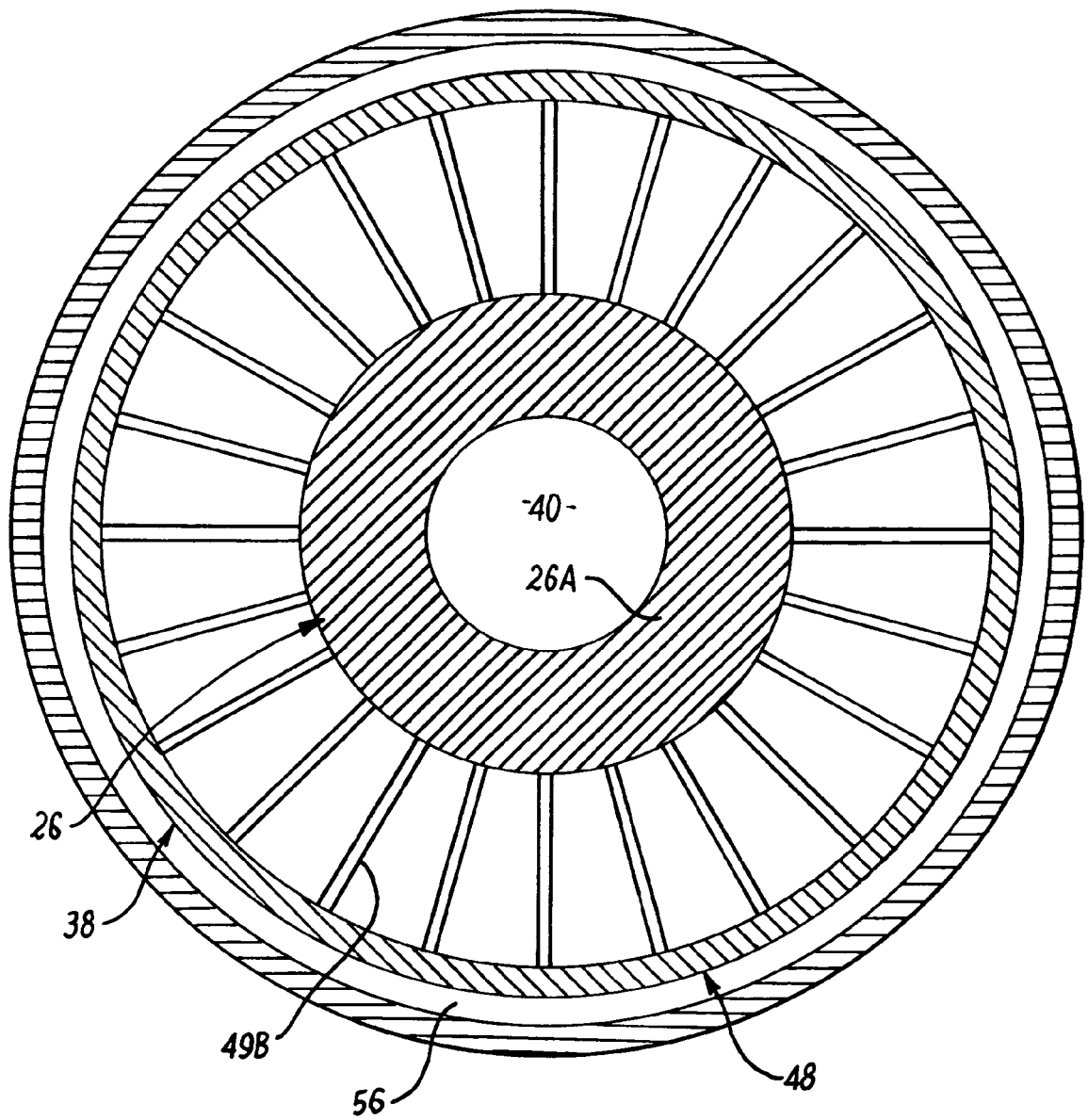
FIG. 4 is a cross-sectional view in the direction of the arrows IV-IV in FIG. 2.

The main body 38 of the coupling assembly 36 comprises a first annular chamber 46 (shown in more detail in FIG. 3) to which the first power transmission shaft 24 is connected, and a second annular chamber 48 (shown in more detail in FIG. 4) to which the second power transmission shaft 26 is connected. A plurality of radially extending first vanes 49A are provided in the first annular chamber 46, and a plurality of radially extending second vanes 49B are provided in the second annular chamber.

A fluid supply means 50A is provided to supply a fluid internally of the portion 26A of the second power transmission shaft 26, the portion 26A being arranged within the central space 40. The fluid supply means supplies fluid to a region internally of the central space 40 of the main body 38 at the portion 26A via a fluid inlet aperture 52A in the side wall of the second power transmission shaft 26. The fluid inlet aperture 52A extends from the portion 26A to the inside of the main body 38.

Alternatively, a fluid supply assembly 50B could be provided to supply fluid externally of the central space and externally of the portion 26A to a fluid supply aperture 52B in the wall of the second fluid chamber 48.

A drain channel 56 is provided to drain fluid from the main body 38 of the coupling assembly 36. The fluid drains via the drain channel 56 is fed into an annular enclosure 58. Suitable circulating means 60 is provided to recirculate the fluid back to the main part 38 via the fluid supply means 50A or 50B.

In use, for example ashen it is desired to start-up an engine, the third power transmission member is connected to a start up motor, and the main body 38 of the coupling assembly 36 is at least partially filled with hydraulic fluid via the fluid supply means 50A or 50B. When the start up motor is turned on, the third power transmission member 44 rotates driving the second power transmission member 26 via the gear arrangement 42. As a result, the second chamber 48 of the main body 38 of the coupling assembly 36 also rotates. Fluid in the second fluid chamber 48 is moved outwardly by centrifugal force and as the speed increases. The hydraulic fluid is flung out of the second fluid chamber 48 into the first fluid chamber 46. The second vanes 49B assist in causing the fluid to move into the first fluid chamber 46. As the fluid passes into the first fluid chamber 46, the fluid strikes the first vanes 49A, thereby transferring the angular momentum of the fluid to the first fluid chamber 46. This causes the first fluid chamber 46 to rotate in the same direction as the second fluid chamber 48. The hydraulic fluid is drained out of the main part body 38 via the drain apertures 56 to be recirculated via the recirculating means 60 to be supplied back to the main body 38 by the fluid supply means 50A or 50B.

Thus, during start up of the engine 10, the first and second power transmission shafts 24, 26 are coupled together by the action of the fluid between the first and second members 46, 48 of the coupling assembly 36 and both of the first and second power transmission members 24, 26 rotate together. As explained above, the first power transmission member 24 is drivingly connected to the high pressure main shaft 28 and thereby the rotation of the first power transmission member 24 turns the high pressure shaft 28, thereby turning the high pressure compressor 14 and turbine 16. At the same time, fuel is supplied to the combustor 15 and igniters are operated to ignite the engine. When ignition has started and the engine is self powering, the supply of fluid to the main body 38 of the coupling assembly 36 can be shut off. As a result, fluid draining from the main body 38 is not replenished and eventually the main body 38 is emptied of fluid and the first fluid chamber 46 is decoupled from the second fluid chamber 48 to allow the first and second power transmission members 24, 26 and, thereby the high and intermediate pressure main shafts 28, 30 to turn independently.

The operation of the gas turbine engine 10 is required to provide electricity to various parts of the aeroplane. Power is taken off from the intermediate pressure main shaft 30 via the second power transmission shaft 26 which is connected by the gear 34 to the intermediate pressure main shaft 30. The second power transmission shaft 26 is also connected via the gear arrangement 42 to the third power transmission member 44 which, in turn, can be connected to a generator for generating electric power. Thus, when the coupling assembly 36 is in its decoupled condition, decoupling the first and second power transmission shaft 24, 26, from each other, power can be taken directly from the intermediate pressure shaft 30 without involving the high pressure shaft 28.

Figure 5:
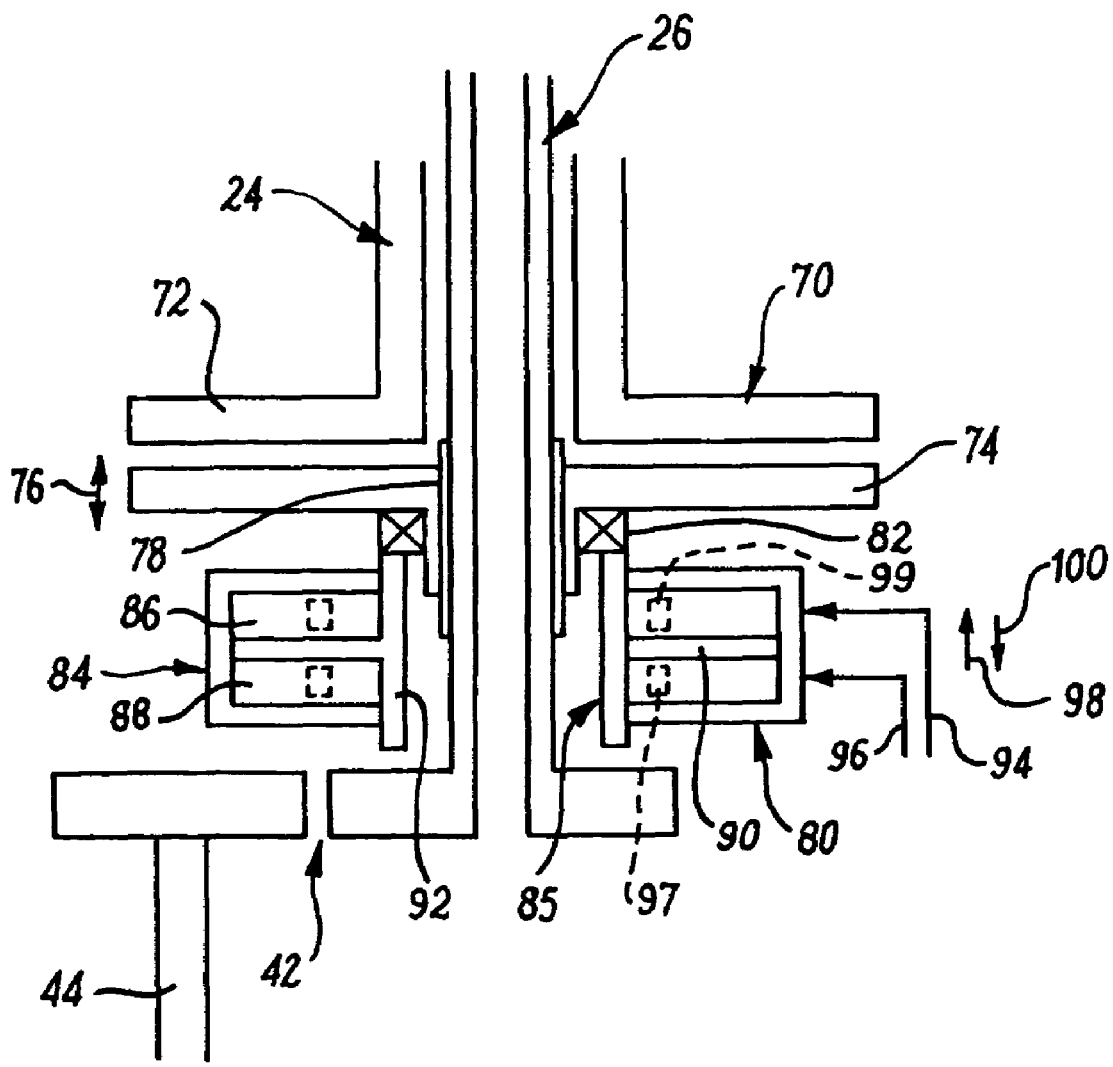
FIG. 5 is a diagrammatic cross-sectional view through part of the engine shown in FIG. 1, showing a further embodiment of a power transmission arrangement.

Referring to FIG. 5, there is shown a further embodiment of a power transmission arrangement. In FIG. 5, many of the features are the same as in FIG. 2 and these have been designated with the same reference numerals.

The first and second power transmission shafts 24, 26 are selectively coupled to, and decoupled from, each other by a coupling assembly in the form of a friction clutch 70.

The friction clutch 70 comprises a driven clutch plate 72 fixedly mounted on the first power transmission shaft 24, and a driving clutch plate 74 slidably mounted on the second power transmission shaft 26. The driving clutch plate 74 can slide along the second power transmission shaft 26 in the direction indicated by the double headed arrow 76 but is prevented from rotating around the second power transmission shaft 26 by axially extending splines 78 on the second power transmission shaft 26.

The friction clutch 70 also comprises force applying means in the form of a piston arrangement 80 and a thrust bearing 82 connected to the driving plate 74 and to the piston arrangement 80.

The piston arrangement 80 comprises an annular piston holder 84 and a piston 85. The piston holder 84 defines first and second chambers 86, 88. The piston 85 comprises an annular radially outwardly extending separator 90 which extends into the piston holder 84 to separate the first and second chambers 86, 88 from each other.

The piston 85 also includes an annular axially extending piston member 92 to which the separator 90 is fixedly connected. The piston member 92 is connected to the thrust bearing 82.

First and second hydraulic fluid supply lines 94, 96 are provided to supply hydraulic fluid respectively to the first and second chambers 86, 88 to move the piston 85 in the directions indicated by the arrows 98, 100. In operation, hydraulic fluid supplied along the first fluid supply line 94 enters the first chamber 86 and the force provided by the pressure in the first chamber 86 pushes the separator 90 and, hence, the piston member 92, and the driving clutch plate 74 in the direction indicated by the arrow 100, thereby disengaging the driving clutch plate 74 from the driven clutch plate 72 to decouple the first power transmission shaft 24 from the second power transmission shaft 26. When hydraulic fluid is supplied along the second fluid supply line 96, the fluid enters the second chamber 88 and the pressure therein pushes the separator 90 and hence the driving clutch plate 74 in the direction indicated by the arrow 98 to engage the driven clutch plate 72, thereby coupling the first power transmission shaft 24 to the second power transmission shaft 26.

Figure 6:
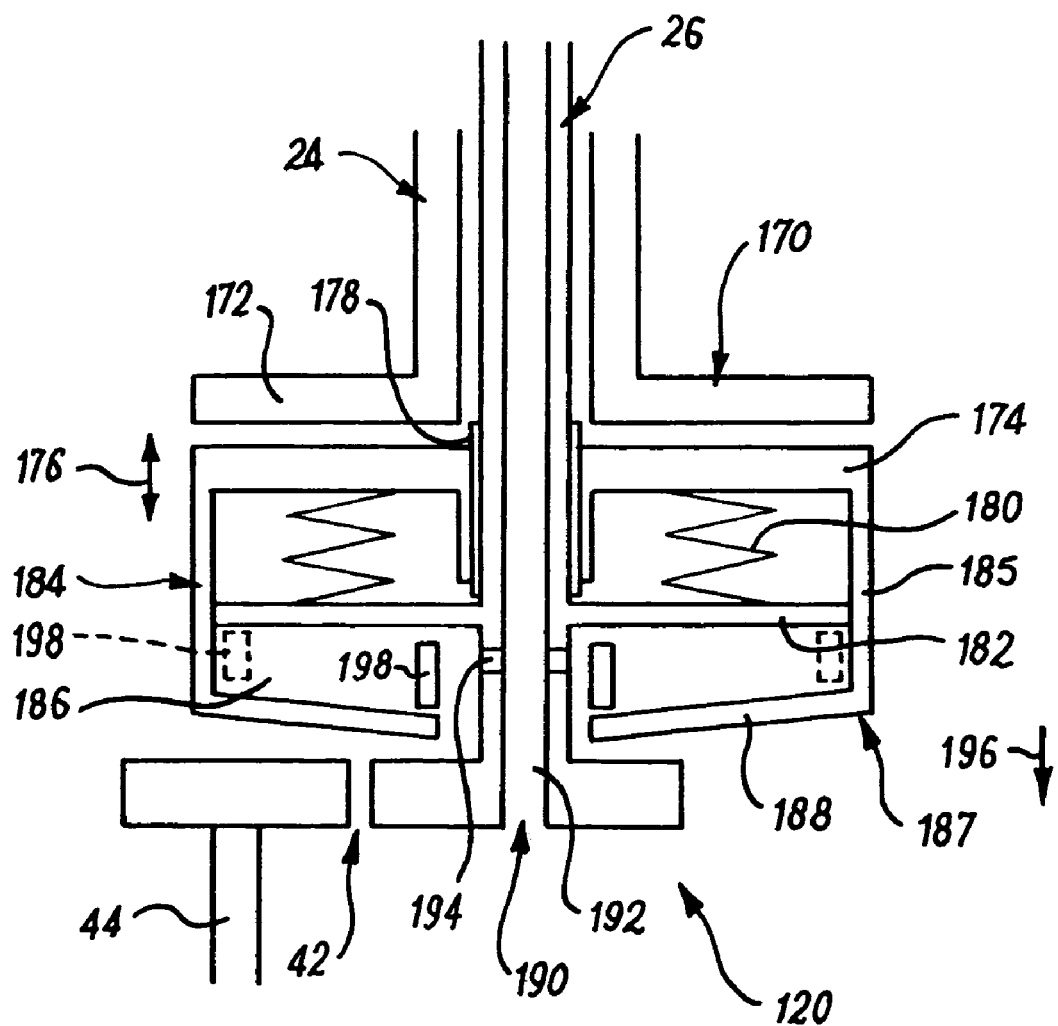
FIG. 6 is a diagrammatic cross-sectional view through part of the engine shown in FIG. 1, showing another embodiment of a power transmission arrangement.

Referring to FIG. 6 there is shown a further embodiment of a power transmission arrangement, designated 120. In FIG. 6 many of the features are the same as in FIGS. 2 and 5, and these have been designated with the same reference numeral.

The first and second power transmission shafts 24, 26 are selectively coupled to, and decoupled from, each other by a coupling assembly in the form of a fluid clutch 170.

The fluid clutch 170 comprises a driven clutch plate 172 fixedly mounted on the first power transmission shaft 24, and a driving clutch plate 174 slidably mounted on the second power transmission shaft 26. The driving clutch plate 174 can slide along the second power transmission shaft 26 in the direction indicated by the double headed arrow 176, but is prevented from rotating around the second power transmission shaft 26 by axially extending spines 178 on the second power transmission shaft 26.

The fluid clutch 170 also comprises force applying means in the form of a spring arrangement 180 and a reaction member in the form of a reaction plate 182 that extends radially from the second power transmission shaft 26. The spring arrangement 180, which surrounds the second power transmission shaft 26, bears against the reaction plate 182 and the driving clutch plate 174 to push the driving clutch plate 174 towards the driven clutch plate 172.

A housing 184 comprises an axially extending annular wall member 185 which extends around the spring arrangement 180. The wall member 185 also extends axially along the second power transmission member 26 beyond the reaction plate 182 to define a toroidal chamber 186 on the opposite side of the reaction plate 182 to the spring arrangement 180. The portions of the housing 184 defining the chamber 186 provide a portion 187, as explained below. The housing 184 also includes an inwardly extending member 188 which extends from the wall member 185 towards the second power transmission shaft 26. Thus, the chamber 186 is defined by the wall members 185, the reaction plate 182, and the inwardly extending member 188 and the second power transmission member 26. As can be seen the annular inwardly extending member 188 is tapered relative to the reaction plate 182.

In operation, after the engine has been started up and is self sustaining the first and second power transmission shafts rotate at high speeds. Oil is then supplied, as indicated by the arrow 190 into a longitudinally extending bore 192 in the second power transmission shaft 26. The second power transmission shaft 26 defines a plurality of radially extending feed holes 194 which extend through the second power transmission shaft 26 from the bore 192 to feed oil into the chamber 186.

As the oil enters the chamber 186 under centrifugal force, the oil is at a high pressure, which pushes axially on the inwardly extending member 188 to move the portion 187 in the direction of the arrow 196, thereby separating the driving clutch plate 174 from the driven clutch plate 172 to allow the first and second power transmission shafts 24, 26 to rotate independently of each other.

The fluid clutch 170 also includes a safety ring 198 provided within the chamber 186 around the second power transmission member 26. The safety ring 198 is a split ring and during operation of the engine, the centrifugal force created by the rotation of the second power transmission shaft 26 cause the ring 198 to open and move radially outwardly to the position shown in broken lines in FIG. 6. In this position the ring 198 can prevent the clutch plates 172, 174 from re-engaging each other if the supply of oil into the chamber 186 should fail.

As an alternative to the steps of feeding oil to the chamber 196 only when the engine is self sustaining, the portion 187 can be configured such that oil is fed to the chamber constantly but the portion 187 would be moved in the direction of the arrow 196 only when the second power transmission shaft 26 reaches a predetermined speed.

Figure 7:
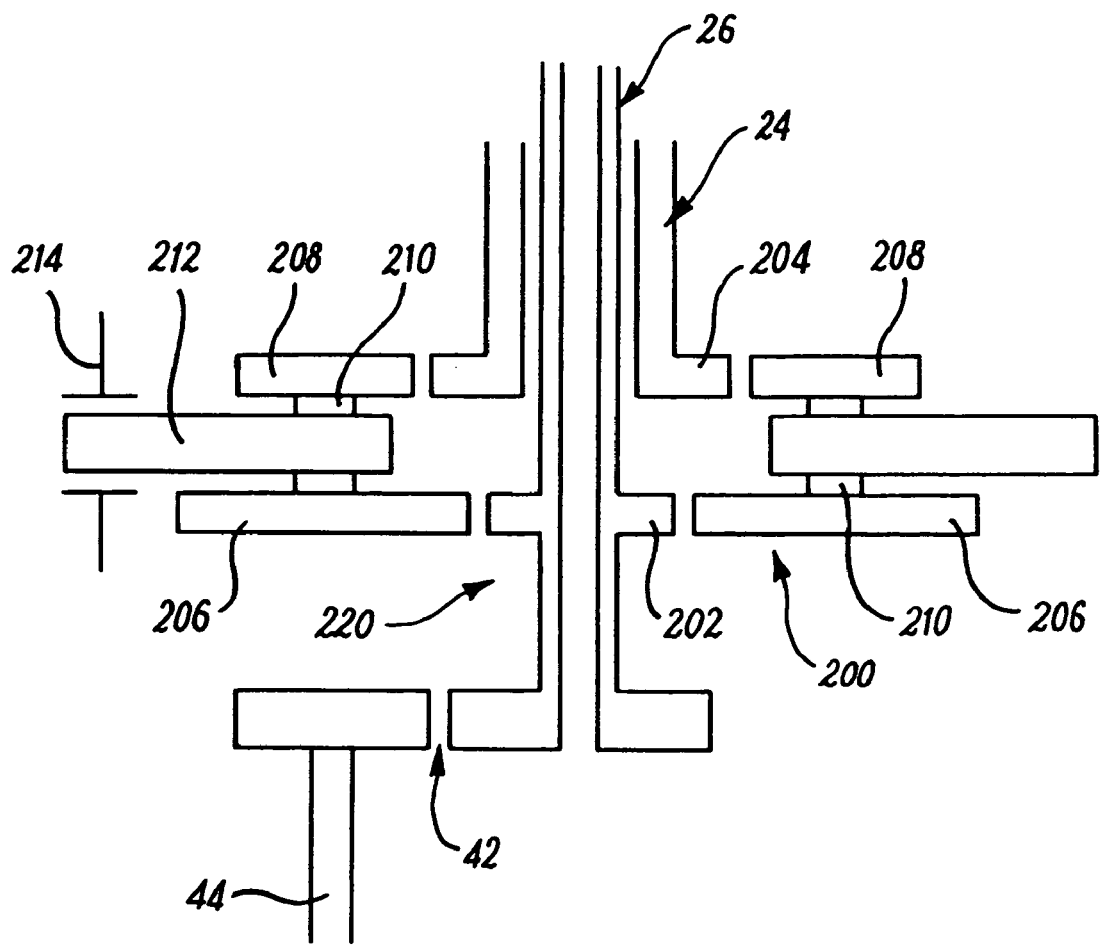
FIG. 7 is a diagrammatic cross-sectional view through part of the engine shown in FIG. 1 showing yet another embodiment of a power transmission arrangement.

A further embodiment of a power transmission arrangement, designated 220, is shown in FIG. 7, in which many of the features are the same as shown in FIGS. 2, 5 and 6. These features have been designated with the same reference numeral.

The first and second power transmission shafts 24, 26 are connected to each other by a planetary gear arrangement 200.

The planetary gear arrangement 200 comprises a primary sun gear 202, fixedly mounted on the second power transmission shaft 26, and a secondary sun gear 204, fixedly mounted on the first power transmission shaft 24. The planetary gear arrangement 200 includes a plurality of primary planetary gears 206, each being in meshing engagement with the primary sun gear 202, and further includes a plurality of secondary planet gears 208, each being in meshing engagement with the secondary sun gear 204. The primary and secondary planet gears 206, 208 are co-axial with one another and are connected to each other at their axes by a respective gear shaft 210. The gear shafts 210 transmit rotary motion of the primary planet gears 206 to the respective secondary planet gears 208.

An annular carrier 212 is provided between the primary and secondary planet gears 206, 208, such that the primary and secondary planetary gears 206, 208 are arranged on opposite axial sides of the carrier. The main axis of the carrier is coincident with the main axes of the first and second power transmission shafts 24, 26. The gear shaft, 210 extend through the carrier 212 and rotation of the carrier 212 about the first and second power transmission shaft 24, 26 causes corresponding rotation of the primary and secondary planet gears 206, 208 about the first and second power transmission shafts 24, 26.

A brake 214 is provided. The brake 214 has a braking position in which the brake 214 engages the carrier 212 and locks the carrier 212 to prevent rotation of the carper 212. The brake 214 also has a released position in which the carrier 212 is not locked by the brake 214 and can rotate around the first and second power transmission shafts 24, 26.

When the brake 214 is in the braking position, the carrier 212 is prevented from rotating around the first and second power transmission members 24, 26. As a result the primary and secondary planet gears 206, 208 are also prevented from rotating around the first and second power transmission shafts 24, 26. In this condition, the rotation of the second power transmission shaft 26 is transmitted by the primary sun gear 202 to the primary planet gear 206 to cause the primary planet gear 206 to rotate about its own axis. This rotation is transmitted by the gear shaft 210 to the secondary planet gear 208. The rotation of the secondary planet gear 208 causes the secondary sun gear 204 to rotate which, in turn, causes the second power transmission shaft 24 to rotate about its axis.

Thus, when the brake 214 is applied and is in the braking position, in the first and second power transmission shafts are coupled to each other and rotation of the second power transmission shaft 26 is transmitted via the planetary gear arrangement 200 to the first power transmission shaft 24, thereby causing the first and second power transmission shaft 24, 26 are coupled to each other.

When the brake 214 is released, the primary and secondary planet gears 206, 208, and hence the carrier 212 rotate around the first and second power transmission shaft 24, 26. This allows the first and second power transmission shafts effectively, to rotate independently of one another. Thus, when the brake 214 is released the first and second power transmission shafts 24, 26 are effectively decoupled from one another.

Figure 8:
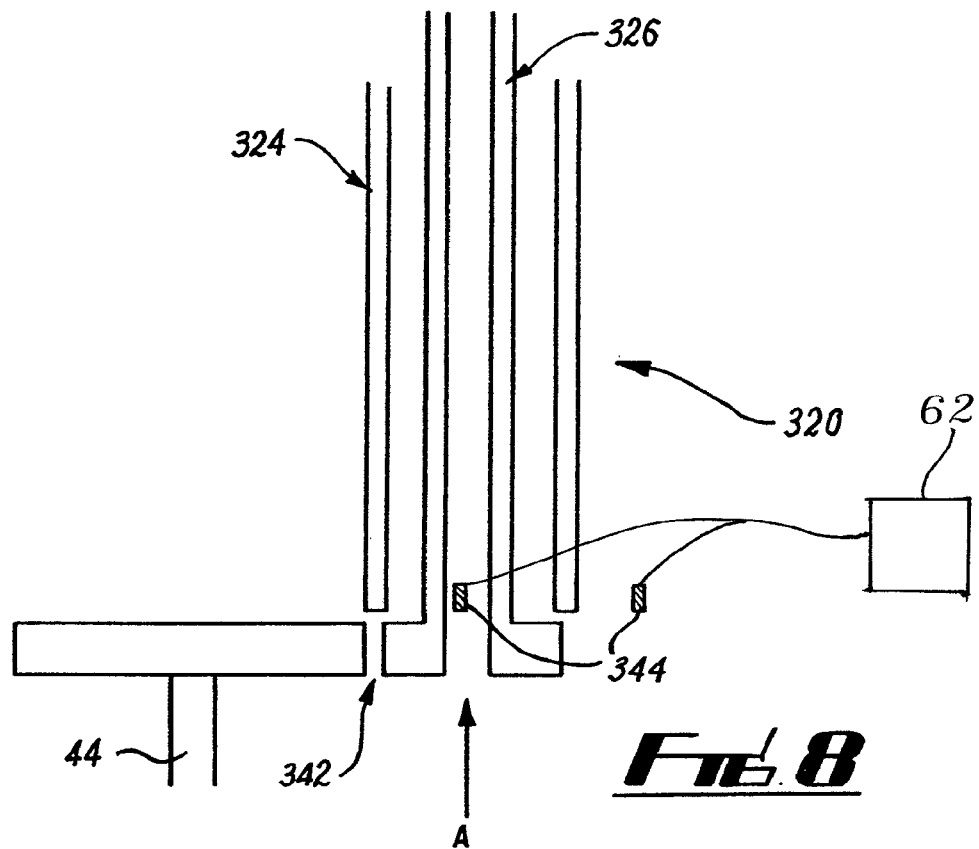
FIG. 8 is a diagrammatic cross-sectional view through part of the engine shown in FIG. 1 showing a further embodiment of a power transmission arrangement.
Figure 9:
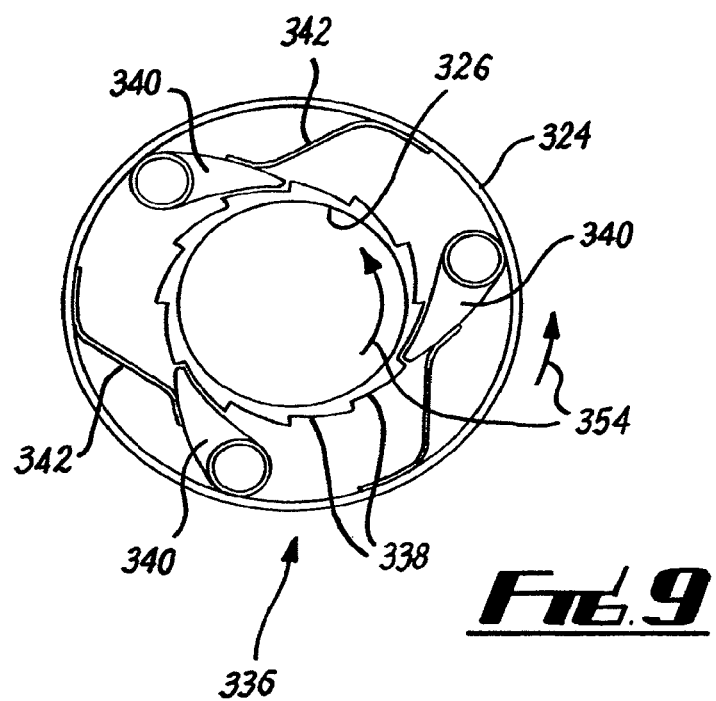
FIG. 9 is a view along the arrow A in FIG. 8.

Referring to FIGS. 8 and 9, there is shown a further embodiment of the power transmission arrangement, designated 320.

The arrangement 320 shown in FIGS. 8 and 9 comprises concentric first and second power transmission shafts 324, 326 with the shaft 326 located within the shaft 324. The power transmission shafts 326, 324 extend generally radially relative to the intermediate pressure and high pressure shafts 28, 30 of the gas turbine engine 10. The first power transmission shaft 324 connects to the high pressure shaft of the gas turbine engine 10 and the second power transmission shaft 326 connects to the intermediate pressure shaft of the gas turbine engine 10.

The first and second power transmission shafts 324, 326 terminate in a coupling assembly 336, which comprises a plurality of ratchets 338 around the circumference of the first power transmission shaft 324. Three pawls 340 are provided on the interior of the second power transmission shaft 326 and are urged by springs 342 onto the ratchets 338. Speed sensors 344 are provided in the coupling assembly 336 to detect the respective speeds of the first and second power transmission shafts 324, 326 and transmit these to an engine control unit 62.

A gear arrangement 346 is provided towards the end of the second power transmission shaft 326 to connect the intermediate pressure power transmission shaft to the third power transmission shaft 44.

In use, to start the engine 10, the unit 62 acts as a starter to rotate the third power transmission shaft 44. This causes via the gear arrangement 346, the second power transmission shaft 326 to rotate, and the coupling arrangement 336 also causes the first power transmission shaft 324 to rotate. These cause the intermediate pressure compressor 13 and turbine 17 to turn, and also cause the turning of the high pressure compressor 14 and turbine 16.

Once the engine 10 becomes self running the high pressure shaft 28 and hence the first power transmission shaft 324 will rotate at a higher speed than the intermediate pressure shaft 30 and second power transmission shaft 326. With references to FIG. 9 this causes the ratchets 338 to move past the pawls 340 in the anticlockwise direction shown by the arrow 354 to allow different relative speeds. Once the engine 10 is self running, the unit 62 will switch from being a starter to a generator, and the generator will be powered by the second transmission shaft 326 via the gear arrangement 346 and the third transmission shaft 44.

The increased drag on the intermediate pressure compressor 13 increases the gradient of this compressor's working line, and therefore improves handling characteristics. This enables the intermediate pressure compressor 13 to be designed with reduced surge margin at design point and thus be able to achieve higher work per stage and improved efficiency.

In use, the high pressure shaft 28 rotates at approximately three times the speed of the intermediate pressure shaft 30. It is advantageous that power is taken off the intermediate pressure shaft 30 as mechanical drag is less than fro the high pressure shaft 28.

These arrangements 20, 120, 220 and 320 also enable the high pressure shaft 28 to be turned during the starting, but not of course to generate auxiliary power. It is advantageous to start turning the high pressure shaft 28 as it has lower inertia, and the high pressure compressor 14 delivers a set pressure charge to the combustion chamber 15 supplying sufficient power to push the burnt gases rearward through the high pressure turbine 16, thereby giving self powering. If only the intermediate pressure shaft 30 is turned during starting, air has to be compressed and pushed through the high pressure turbine 16 before self power takes over. This leads to a relatively slow starting.

The speed sensors can be used in conjunction with the engine control unit to avoid crash re-engagement of the coupling arrangements 336. This could occur when the high pressure shaft 28 is rotating at the same time as the unit 62 is operating as a starter. With input from the speed sensors 344 the unit 62 can be controlled to re-engage smoothly with the first power transmission member 324.

Figure 10:
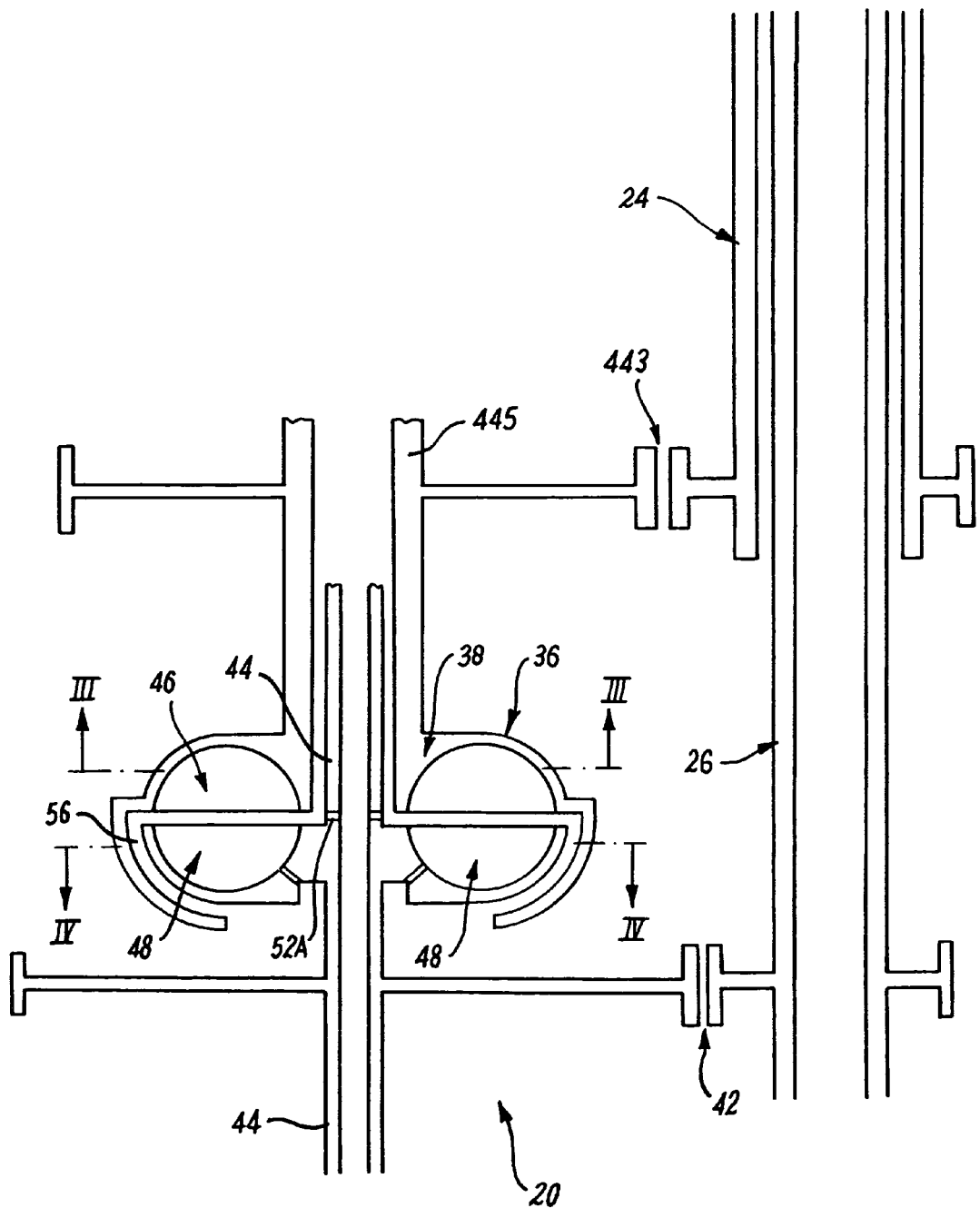
FIG. 10 is a diagrammatic cross-sectional view through part of the engine shown in FIG. 1 showing a still further embodiment of a power transmission arrangement.

A further embodiment is shown in FIG. 10, which is similar to the embodiment shown in FIG. 2 and the same features have been designated with the same reference numerals.

The embodiment shown in FIG. 10 differs from that shown in FIG. 2 in that the coupling assembly 36 is offset from the first and second power transmission shafts 24, 26. Also, the third power transmission shaft 44 is connected directly to the second annular chamber 48, and is co-axial therewith.

The third power transmission shaft 44 is connected by the gear arrangement 42 to the second power transmission shaft 26 and, as such, is the same as the embodiment shown in FIG. 2. However, the first power transmission shaft 24 is connected to the first annular chamber 46 by a first ancillary gear arrangement 443, and an ancillary shaft 445. The subsidiary shaft 445 is mounted directly on the first annular chamber 46.

This arrangement has the advantage that the gear arrangements 42, 443 allow the speed ratio between the first and second power transmission shafts (and therefore between the main shafts during engine starting) to be tailored more efficiently for optimum engine performance.

There are thus described efficient arrangements for providing start up power in the gas turbine engine to the high pressure shaft and for taking power from the gas turbine engine via the intermediate pressure shaft and allowing two shafts to be coupled to each other and decoupled from each other as desired.

Various modifications can be made without departing from the scope of the invention. For example in the case of the friction clutch shown in FIG. 5, an engagement spring 97 (shown in broken lines in FIG. 5) can be provided on one side of the separator 90 to assist engagement of the clutch plates 72, 74 at low speeds. Similarly, a second disengagement spring 99 can be provided on the other side of the separator 90 to ensure disengagement of the clutch plates 72, 74 in failure conditions.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A power transmission arrangement for a gas turbine engine having in axial flow series a first stage compressor, a second stage compressor, a first stage turbine and a second stage turbine, a first main shaft connecting the first stage turbine to the second stage compressor so that the first stage turbine drives the second stage compressor during operation of the engine, and a second main shaft connecting the second stage turbine to the first stage compressor so that the second stage turbine drives the first stage compressor during operation of the engine, said power transmission arrangement comprising:
   a first power transmission member connectable to the first main shaft;
   a second power transmission member connectable to the second main shaft;
   a third power transmission member; and
   a coupling assembly having a selectable coupling condition to couple the first power transmission member to the second power transmission member to allow power to be transmitted from the third power transmission member to the first main shaft via the first power transmission member, and having a selectable decoupling condition to decouple the first power transmission member from the second power transmission member to allow power to be transmitted from the second main shaft to the third transmission member via the second transmission member.

2. A power transmission arrangement according to claim 1 wherein the coupling assembly is mounted on the first and second power transmission members.

3. A power transmission arrangement according to claim 1 wherein the coupling assembly comprises a fluid operated clutch.

4. A power transmission arrangement according to claim 1 wherein the coupling assembly comprises a main body having first and second parts movable relative to each other.

5. A power transmission arrangement according to claim 4 wherein the second power transmission member comprises a connection member to drivingly connect the third power transmission member thereto.

6. A power transmission arrangement according to claim 5 wherein the connection member comprises a gear to drivingly connect the third power transmission member to the second transmission member.

7. A power transmission arrangement according to claim 5 wherein the second power transmission member extends through the main body to said connection member.

8. A power transmission arrangement according to claim 4 wherein the first part comprises a first fluid chamber, and the second part comprises a second fluid chamber, the first and second parts being in fluid communication with each other.

9. A power transmission arrangement according to claim 8 wherein each of the first and second fluid chambers is of an annular configuration.

10. A power transmission arrangement according to claim 9 wherein each of the first and second fluid chambers is of a toroidal configuration.

11. A power transmission arrangement according to claim 9 wherein the main body has a configuration of a torus defining a space to receive at least one of said first and second power transmission members.

12. A power transmission arrangement according to claim 11 wherein the space receives both of said first and second power transmission members and the second power transmission member extends wholly through the aforesaid space.

13. A power transmission arrangement according to claim 8 wherein each of the chambers includes a plurality of radially extending vanes.

14. A power transmission arrangement according to claim 8 wherein the coupling assembly comprises an enclosure in which the main body is arranged, and fluid from the main body can drain into the enclosure.

15. A power transmission arrangement according to claim 8 wherein the coupling assembly comprises a fluid supply system to supply fluid to the main body.

16. A power transmission arrangement according to claim 15 wherein the fluid supply system is arranged to supply fluid to the main body via the central member extending into, or through, said central space.

17. A power transmission arrangement according to claim 15 wherein the fluid supply system is arranged to supply to the main body externally of the central space.

18. A power transmission arrangement according to claim 17 wherein the fluid supply is supplied through one or more fluid supply holes in the main body.

19. A power transmission arrangement according to claim 4 wherein the main body includes drain means to allow fluid in the main body to drain there from.

20. A power transmission arrangement according to claim 19 wherein the drain means comprises a drain aperture or a plurality of drain apertures defined in the main body, the, or each, drain aperture being defined in a region between the first and second chambers.

21. A power transmission arrangement according to claim 4 wherein the first part is fixedly mounted on the first power transmission member, and the second part is fixedly mounted on the second power transmission member.

22. A power transmission arrangement according to claim 1 wherein the first and second power transmission members comprise shafts, arranged coaxially relative to each other.

23. A power transmission arrangement according to claim 22 wherein the second power transmission member is arranged within the first power transmission member.

24. A power transmission arrangement according to claim 1 wherein the coupling assembly is offset from the first and second power transmission member and Is connected to the first and second power transmission members by at least one ancillary gear arrangement.

25. A power transmission arrangement according to claim 1, wherein the first main shaft is connected to the first power transmission member, and the second main shaft is connected to the second power transmission member.

26. A power transmission arrangement according to claim 25 further including a starter for starting the drive arrangement, wherein the power transmission arrangement can couple together the first and second power transmission members during starting, whereby the starter can turn both of the first and second main shafts during the aforesaid starting of the drive arrangement, and can decouple the first and second main shafts after the aforesaid starting to permit independent operation of the first and second main shafts.

27. A power transmission arrangement according to claim 26 wherein the starter is connected to the third power transmission member.

28. A power transmission arrangement according to claim 1 including power receiving means connected to the third power transmission member and the second main shaft drives the power receiving means after decoupling of the first and second main shafts from each other.

29. A power transmission arrangement for a gas turbine engine, said gas turbine engine comprising:
an intermediate pressure compressor;
a high pressure compressor;
a high pressure turbine;
an intermediate pressure turbine;
a first main shaft connecting said high pressure compressor and said high pressure turbine;
a second main shaft connecting said intermediate pressure compressor and said intermediate pressure turbine; and
a power transmission arrangement arranged between said intermediate compressor and said high pressure compressor, said power transmission comprising:
a coupling assembly;
a first power transmission shaft connected to said first main shaft;
a second power transmission shaft connected to said second main shaft; and
a third power transmission member, wherein said second power transmission shaft is arranged within said first power transmission shaft, and wherein said first and second power transmission shafts are selectively coupled to, and decoupled from, each other by said coupling assembly to allow power to be transmitted from the third power transmission member via the power transmission arrangement to the first main shaft when the first and second power transmission shafts are selectively coupled and to allow power to be transmitted to the third power transmission member via the power transmission arrangement from the second main shaft when the first and second power transmission shafts are selectively decoupled.

30. A power transmission arrangement according to claim 29, wherein said coupling assembly comprising a main body defining a central space, a fluid supply means, a first annular chamber having a plurality of radially extending first vanes, and a second annular chamber having a plurality of radially extending second vanes wherein said coupling assembly has a selectable coupling condition to couple said first power transmission shaft to said second power transmission shaft in which power is transmitted from said third power transmission member to said first main shaft via said first power transmission shaft, and wherein said coupling assembly has a selectable decoupling condition to decouple said first power transmission shaft and said second power transmission shaft to allow said first main shaft and said second main shaft to turn independently of each other.

31. A power transmission arrangement according to claim 29, wherein said coupling assembly comprising a friction clutch.

32. A power transmission arrangement according to claim 31, wherein said friction clutch comprising:
   a driven clutch plate mounted on said first power transmission shaft;
   a driving clutch plate slidably mounted on said second power transmission shaft;
   a piston arrangement and a thrust bearing, said piston arrangement comprising an annular piston holder and a piston wherein said annular piston holder defines a first chamber and a second chamber, and wherein said piston comprises a separator fixedly connected to an annular axially extending piston member such that said separator extends into said annular piston holder to separate said first and second chambers from each other;
   a first fluid supply line for supplying hydraulic fluid to said first chamber; and
   a second fluid supply line for supplying hydraulic fluid to said second chamber wherein said coupling assembly has a selectable coupling condition in which said driving clutch plate engages said driven clutch plate to couple said first power transmission shaft to said second power transmission shaft, and wherein said coupling assembly has a selectable decoupling condition in which said driving clutch plate becomes disengaged from said driven clutch plate to decouple said first power transmission shaft and said second power transmission shaft.

33. A power transmission arrangement according to claim 29, wherein said coupling assembly comprising a fluid clutch.

34. A power transmission arrangement according to claim 33, wherein said fluid clutch comprising:
   a driven clutch plate mounted on said first power transmission shaft;
   a driving clutch plate slidably mounted on said second power transmission shaft;
   a spring arrangement and a reaction plate wherein said reaction plate extends radially from said second power transmission shaft, said spring arrangement surrounding said second power transmission shaft and biasing the driving clutch towards said driven clutch;
   a housing comprising an axially extending annular wall member and an inwardly extending wall member such that said reaction plate, said axially extending wall member and said inwardly extending wall member define a chamber wherein said second power transmission shaft defines a plurality of radially extending feed holes which extend through said second power transmission shaft to feed oil into said chamber; and
   a split ring provided within said chamber which, during operation of said engine, prevents said driven clutch plate and said driving clutch plate from re-engaging each other if the supply of oil into said chamber should fail.

35. A power transmission arrangement according to claim 29, wherein said coupling assembly comprising a planetary gear arrangement.

36. A power transmission arrangement according to claim 35, wherein said planetary gear arrangement comprising:
   a primary sun gear fixedly mounted on said second power transmission shaft;
   a secondary sun gear fixedly mounted on said first power transmission shaft;
   a plurality of primary planetary gears wherein each primary planetary gear is in meshing engagement with said primary sun gear;
   a plurality of secondary planetary gears wherein each secondary planetary gear is in meshing engagement with said secondary sun gear, and wherein the primary and secondary planetary gears are co-axial with one another;
   an annular carrier located between said primary and said secondary planetary gears; and
   a brake having a braking position in which the brake engages said carrier to prevent rotation of said carrier and said primary and secondary planetary gears, and wherein said brake is in said braking position when said first and second power transmission shafts are coupled to each other such that rotation of said second power transmission shaft is transmitted via said planetary gear arrangement to said first power transmission shaft.

37. A power transmission arrangement according to claim 29, wherein said first and second power transmission shafts extend radially relative to said main shaft and said second main shaft.

38. A power transmission arrangement according to claim 37, wherein said gas turbine engine comprises an engine control unit and said first and second power transmission shafts terminate in said coupling assembly, wherein said coupling assembly comprises:
   a plurality of springs;
   a plurality of ratchets provided around a circumference of said first power transmission shaft;
   at least three pawls provided on the interior of said second power transmission shaft, wherein said pawls are urged by said springs onto said ratchets;
   speed sensors provided in said coupling assembly to detect respective speeds of said first and second power transmission shafts; and
   a gear arrangement provided towards an end of said second power transmission shaft to connect said second main shaft to said third power transmission member such that, during use, said first power transmission shaft rotates at a greater speed than said second power transmission shaft which causes said ratchets to move past said pawls, and wherein, during use, said engine control unit switches from acting as a starter to a generator, and wherein said generator will be powered by said second power transmission shaft via said gear arrangement and said third power transmission member.

39. A power transmission arrangement according to claim 29, wherein said coupling assembly comprises a first annular chamber and a second annular chamber.

40. A power transmission arrangement according to claim 39, wherein said coupling assembly is offset from said first and second power transmission shafts.

41. A power transmission arrangement according to claim 39, wherein said third power transmission member is directly connected to said second annular chamber.

42. A power transmission arrangement according to claim 41, wherein said third power transmission member is connected by a gear arrangement to said second power transmission shaft.

43. A power transmission arrangement according to claim 39, wherein said first power transmission shaft is connected to said first annular chamber by a first ancillary gear arrangement and an ancillary shaft, wherein said ancillary shaft is mounted directly on said first annular chamber.

* * * * *